UNITED STATES PATENT OFFICE.

JAMES A. MORRELL, OF NEW YORK, N. Y.

PROCESS OF MANUFACTURING SUGAR.

SPECIFICATION forming part of Letters Patent No. 280,943, dated July 10, 1883.

Application filed November 8, 1880. Renewed December 13, 1882. (No specimens.)

*To all whom it may concern:*

Be it known that I, JAMES A. MORRELL, a citizen of the United States, residing at New York, in the county of New York and State of New York, have invented certain new and useful Improvements in Processes of Manufacturing Sugar; and I do hereby declare the following to be a full, clear, and exact description of the invention, such as will enable others skilled in the art to which it appertains to make and use the same.

Heretofore the method of making sugar from cane-juice, the juice of sorghum, and other similar substances has been to express the juice from the stalk by suitable machinery, and then to defecate it by some of the well-known processes, after which it has been placed in evaporating-pans to which heat has been applied, for the purpose of evaporating the water contained in it, the sugar or sirup remaining in said pan until it has been brought to the proper consistency, when the operation of evaporation has been stopped and the sugar or sirup drawn off into some vessel prepared for its reception. This method has necessitated an intermittent operation, as it could not be continuous on account of the time required to empty and refill the evaporating pans or kettles. It has also required that the heating agent should be shut off from the pans while they were being discharged—an operation rendered necessary in order to prevent the burning or caramelizing of the sugar when the pans have been nearly emptied—a result which has often been produced when the greatest efforts have been made to prevent it.

The object of my invention is to provide for a continuous evaporation of the juices extracted from sugar-cane, sorghum, cornstalks, and other similar sugar-producing substances, and also for the evaporation of saccharine matter obtained from beets, corn, and other similar substances, and to provide for a continuous delivery of the sugar or sirup from the apparatus at any degree of density required between 10° and 40° Baumé; and to this end my invention consists in providing for a continuous evaporation of liquids containing saccharine matter in a vessel or passage having an increasing area from the point where the material enters to the point where it is discharged, from which the air is excluded while in operation, the steam resulting from the evaporation of the water contained in the liquid being retained in contact therewith until it reaches the outlet which is common to both, and for the continuous discharge or delivery of the resultant product, whether it be a sirup of the proper density for granulation or a sirup of less density to be used in a liquid or semi-liquid form, one form of apparatus suitable for carrying out my process being shown in an application for a patent for such device of even date with this.

In practicing my newly-discovered process, I take the juice which has been expressed from cane or other similar substances by any of the well-known machines designed for that purpose, and which has been defecated in the usual or any approved manner, and pass it by its own gravity in a constant stream, or by a pump or other forcing device, through a coil of pipe, the diameter or interior end of which increases from the part where the material enters to the part where it is discharged, or through a closed vessel having a similarly-arranged passage heated by a fire in a suitable furnace, or by steam heated to the requisite temperature, from which the air is excluded and in which the cane-juice or other substance is vaporized, and is maintained in the form of vapor until it reaches the point where the separation of the steam resulting from the vaporization of the water contained in the substance treated from the heavier vapor or from the saccharine matter takes place, which point is understood to be mainly at or near the point where the vapor comes in contact with the atmosphere in being discharged from the apparatus.

When a pump or other forcing device is used, care should be taken that the instrument is so constructed and arranged that it shall inject the liquid in a constant stream in order that the material in passing through the pipe or vessel may not be caramelized or burned.

The consistency of the resulting product may be regulated by a cock or valve placed in the induction-pipe, by which the quantity of the saccharine matter can be regulated, and consequently the density of the material discharged, as the smaller the quantity admitted in a given period of time the longer it will remain in the pipe or vessel and the greater will be its density.

Having thus described my improved process, what I claim, and desire to secure by Letters Patent, is—

The herein-described process for the evaporation of saccharine liquids or semi-liquids, it consisting in passing them in a continuous stream through a heated pipe or channel from which the air is excluded, and in which the passage has an increasing diameter or area from the point where the material enters to the point where it is discharged, whereby a separation is caused to take place between the steam resulting from the evaporation of the water contained in the material treated and the heavier products thereof, at or near the point where the products come in contact with the atmosphere, substantially as set forth.

In testimony whereof I affix my signature in presence of two witnesses.

JAMES A. MORRELL.

Witnesses:
C. M. CONNELL,
A. C. CONSTANTINE.